(12) United States Patent
Biskop

(10) Patent No.: US 10,857,745 B2
(45) Date of Patent: Dec. 8, 2020

(54) METHOD FOR ASSEMBLING THREE-DIMENSIONAL OPTICAL COMPONENTS AND ASSEMBLY KIT

(71) Applicant: LUXEXCEL HOLDING B.V., Eindhoven (NL)

(72) Inventor: Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 131 days.

(21) Appl. No.: 16/028,582

(22) Filed: Jul. 6, 2018

(65) Prior Publication Data
US 2019/0009481 A1    Jan. 10, 2019

(30) Foreign Application Priority Data
Jul. 10, 2017 (EP) .................................. 17180622

(51) Int. Cl.
*B29D 11/00* (2006.01)
*B33Y 10/00* (2015.01)
(Continued)

(52) U.S. Cl.
CPC ...... *B29D 11/00009* (2013.01); *B29C 64/112* (2017.08); *B29D 11/0073* (2013.01);
(Continued)

(58) Field of Classification Search
None
See application file for complete search history.

(56) References Cited

U.S. PATENT DOCUMENTS 5,071,503 A * 12/1991 Berman ................ B23P 15/246
156/250
2004/0084790 A1    5/2004 Blum et al.
(Continued)

FOREIGN PATENT DOCUMENTS

DE          10215568 A1    10/2003
WO        2013167528 A1    11/2013

OTHER PUBLICATIONS

Extended European Search Report for European Application No. EP17180622.7; dated Apr. 9, 2018.
(Continued)

*Primary Examiner* — Lisa L Herring
(74) *Attorney, Agent, or Firm* — The Dobrusin Law Firm, P.C.

(57) ABSTRACT

A method for assembling a three-dimensional optical component from a base body, including providing the base body and loading the base body on a substrate into a printer in a providing step, depositing droplets of printing ink on a first surface of the base body in a first printing step in order to build up an intermediate first pre-structure, depositing droplets of printing ink on a second surface of the base body in a second printing step in order to build up an intermediate second pre-structure, rotating the first pre-structure and arranging the first pre-structure on a support structure in a rearrangement step between the first printing step and the second printing step, wherein the support structure includes a carrier substructure and an extension of the base body rests at least partially on the carrier substructure. The teachings further relate to an assembled optical component and an assembly kit.

15 Claims, 3 Drawing Sheets

(51) Int. Cl.
*B29C 64/112* (2017.01)
*B33Y 80/00* (2015.01)
*B33Y 30/00* (2015.01)

(52) U.S. Cl.
CPC .............. *B33Y 10/00* (2014.12); *B33Y 80/00* (2014.12); *B29D 11/00817* (2013.01); *B33Y 30/00* (2014.12)

(56) References Cited

U.S. PATENT DOCUMENTS

| | | |
|---|---|---|
| 2005/0280769 A1 | 12/2005 | Cano et al. |
| 2012/0019938 A1 | 1/2012 | Yamada |
| 2014/0334000 A1 | 11/2014 | Clere et al. |
| 2015/0241714 A1 | 8/2015 | Allione et al. |
| 2015/0273757 A1 | 10/2015 | Pforte et al. |
| 2016/0161761 A1 | 6/2016 | Quere et al. |
| 2017/0102558 A1 | 4/2017 | Saylor et al. |
| 2017/0274587 A1 | 9/2017 | Hakkaku |
| 2018/0339474 A1* | 11/2018 | Goto ................ B29D 11/00884 |
| 2019/0009455 A1* | 1/2019 | Biskop .................. B33Y 10/00 |

OTHER PUBLICATIONS

European Partial Search Report for European Application No. EP17180622.7; dated Jan. 8, 2018.

* cited by examiner

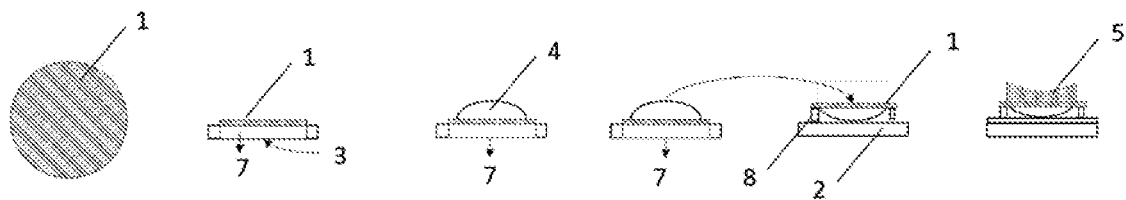
Fig. 1
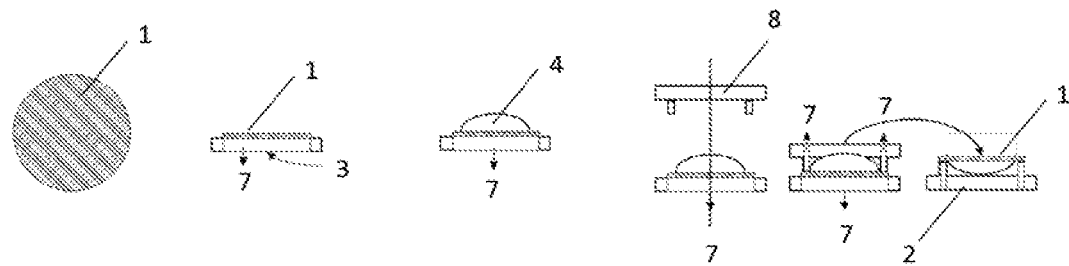
Fig. 2
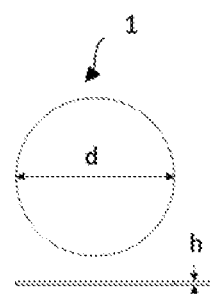
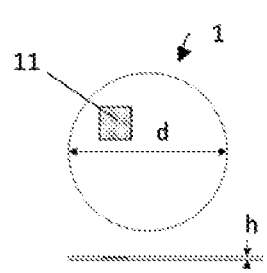
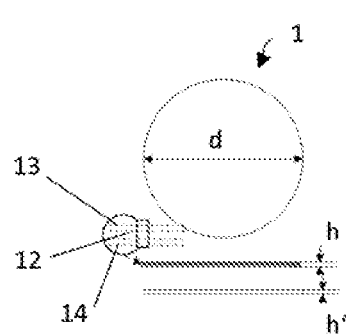
Fig. 3a  Fig. 3b  Fig. 3c

METHOD FOR ASSEMBLING THREE-DIMENSIONAL OPTICAL COMPONENTS AND ASSEMBLY KIT

BACKGROUND

The present invention relates to a method for assembling a three-dimensional optical component from a base body, comprising the following steps: providing the base body and loading the base body on a substrate into a printer in a providing step, depositing droplets of printing ink on a first surface of the base body in a first printing step in order to build up an intermediate first pre-structure, depositing droplets of printing ink on a second surface of the base body in a second printing step in order to build up an intermediate second pre-structure, rotating the first pre-structure and arranging the first pre-structure on a support structure in a rearrangement step between the first punting step and the second printing step.

Thus, the present invention relates to a method for assembling optical components involving double-sided or duplex printing of optical pre-structures by depositing droplets of printing ink at least partially side by side and one above the other on a base body Such a method has been mentioned in WO2013/167528 A1, It is a drawback of named method that it does not allow an easy automation. Therefore, the method as mentioned in WO2013/167528 A1 is insufficient for large-scale production applications. Moreover, it is a drawback of named method that capillary effects draw parts of the first pre-structure in a gap between the first pre-structure and the support structure after arrangement of the first pre-structure on the support structure. This leads to unwanted deformations of the first pre-structure and thus of the final optical component comprising the first pre-structure and the second pre-structure, preventing duplex printing of optical components of a specified shape. This is particularly detrimental for optical components, as here, retaining the specified shape of the printed layers as well as the final structure is mandatory in order to obtain an optically useful product.

SUMMARY

It is therefore a purpose of the present invention to provide method for assembling optical components that can easily be automated and used in large-scale production without compromising the accuracy and precision needed in the production of optical components. In particular, the present invention provides a method that allows to provide optical components easily, quickly and on demand, also in a customized fashion.

This object is accomplished according to the present invention by a method for assembling a three-dimensional optical component from a base body, comprising the following steps: providing the base body and loading the base body on a substrate into a printer in a providing step, depositing droplets of printing ink on a first surface of the base body in a first printing step in order to build up an intermediate first pre-structure, depositing droplets of printing ink on a second surface of the base body in a second printing step in order to build up an intermediate second pre-structure, rotating the first pre-structure and arranging the first pre-structure on a support structure in a rearrangement step between the first printing step and the second printing step, characterized in that the support structure comprises a carrier substructure and an extension of the base body rests at least partially on the carrier substructure.

Herewith a method for assembling an optical component is provided that can be easily automated and thus be used in industrial production processes. In particular, the base body advantageously allows easy handling of the optical components during production and upon removal from the printer as printed parts do not have to be contacted (by man or machine) during the handling. Upon the base body, the optical component is printed in a duplex printing method, allowing a provision of, in particular customized, optical components on-demand. Three-dimensional printing through deposition of curable layers leads to deformation of the intended shape of the printed structure due to shrinking of the layer material, in particular during curing. Known countermeasures compensate for this shrinking effect through complex feedforward or feedback mechanisms under which the shrinking is pre-compensated for in the design of the three-dimensional structure to be build or dynamically compensated for by adjusting the print process on the basis of the dynamically measured shape of the object, respectively, i.e. these countermeasures do not eliminate the shrinking effects, but compensate for the resulting deformations. Printing on a base body, however, beneficially prevents shrinking effects without resorting to compensation measures. Through the base body, the three-dimensional structure under construction retains both its internal layered structure as well as its intended final shape. This is particularly important for applications which are negatively impacted by a deformation of the internal layers, e.g. optically transparent structures such as lenses as well as structures with embedded components requiring a fixed geometrical location such as flat Liquid Crystal Displays in an optical structure. In addition, the base body provides an extension. The extension comprises a fixation extension, an anti-capillarity extension and/or a handling extension. The fixation extension allows a fixation of the pre-structures during the printing process. The handling extension allows an easy handling of the optical component during the printing process, preventing the actual printed structure from being deteriorated through contact. The anti-capillarity extension prevents capillary effects from dragging parts of the pre-structures into a gap between the first pre-structure and the support structure during and after the rearrangement step. In this way, unwanted deformations of the pre-structures due to capillary effects are avoided and a gluing of the first and/or second pre-structures to the support structure is prevented. Thus, the present invention provides a method for duplex printing of an optical component with an intended shape, uncompromised by deformations. Duplex printing is particularly beneficial for optical components.

According to a preferred embodiment, the support structure comprises a deformation-control substructure. The deformation-control substructure of the support structure allows to control deformations of the pre-structures. On the one hand, the deformation-control substructure may protect the pre-structures from sagging, in particular due to acting gravitational forces, but also deformations due to shrinking of the printing material, e.g. polymer shrinkage, as well as deformations due to thermal effects, e.g. thermal expansion. In this way, unwanted deformations of the pre-structures are avoided. On the other hand, the deformation-control substructure may be used to induce intended deformations in the pre-structures, e.g. the first pre-structure may be slowly inflated in order to achieve a meniscus lens via singie sided printing.

In the sense of the present invention, printing a three-dimensional structure is carried out by depositing droplets of printing ink side by side and one above the other in several consecutive depositing steps by means of a print head, wherein in each depositing step a plurality of droplets is ejected simultaneously by a plurality of ejection nozzles of the print head. The three-dimensional structure is thus build up layer by layer. As known from the prior art, the deposited droplets are at least partly cured after each depositing step in a curing step. The printing ink of the deposited droplets is either fully cured after each depositing step or only partly cured. It is a known technique from the prior art, see WO2013/167528 A1, to let a time interval elapse between the deposition of the droplets and their curing. This allows the droplets to flow under the influence of gravitation in a direction tangent to the surface of the layer just printed, resulting in a particularly smooth surface. Whereas for general three-dimensional structures the smoothness of the layer surfaces is only important for the layers forming the surface of the final structure, a smooth layer structure is equally important for optically transparent structures, e.g. lenses. Preferably, the printing ink comprises an UV curable liquid monomer becoming a polymer if being cured. The printing ink preferably comprises transparent or translucent printing ink.

The optical structure to be printed can be of any geometrical shape. The present method is particularly suitable, however, for optical components of flat shape. In the sense of the present invention, an optical component of flat shape is a three-dimensional structure that is thin in one dimension, i.e, the extension of the optical component in one dimension is noticeably smaller than the extension of the optical component in the other two dimensions. Preferably, the design of the optical component is split into two parts forming the first and second pre-structure, respectively, with the base body forming a central plane as contact surface of the first and second pre-structures. For an optical component of flat shape, the central plane is preferably orthogonal to the thin dimension. Here, "central" does not imply that the plane lies in a particular geometrical or mechanical plane, e.g. crosses the center of gravity or the like.

In the sense of the present invention, the base body forms part of the first pre-structure after the first printing step. During the rearrangement step, the first pre-structure is either first rotated and then arranged on the support structure or the first pre-structure is first arranged on the support structure and then rotated. For the purpose of this document, "arranged on the support structure" means that the first pre-structure is brought into contact with the support structure. The first pre-structure may be arranged above or below the support structure, where "below" and "above" are determined by the flight direction of droplets of printing ink during the printing process, i.e. droplets move from above to below.

In the sense of the present invention, the base body is loaded on a substrate, i.e it is retrieved from its location and arranged on a substrate. Loading may be an automated process step. The location may be inside the printer or outside the printer.

In a preferred embodiment of the present invention, the first pre-structure is flipped, i.e, rotated about a horizontal axis, by 180° during the rearrangement step and the second pre-structure is printed on the underside of the first pre-structure, i.e, on the base body.

According to a preferred embodiment of the present invention, the surface of the at least one side of the base body is prepared for printing in a surface treatment step between the rearrangement step and the second printing step and/or between the first printing step and the rearrangement step. In particular, the surface of the at least one side of the base body is treated such that the droplets deposited on this side during the first or second printing step form stable bonds with the at least one side of the base body. Preferably, the surface is heated during the surface treatment step, most preferably in case of a printed base body, such that at least part of the droplets comprising the surface are liquefied during the surface treatment step. Alternatively or additionally, the surface can be roughened or coated during the surface treatment step.

According to a preferred embodiment of the present invention the carrier substructure comprises an outer region of the support structure and the deformation-control substructure comprises an inner region of the support structure. In a preferred embodiment, the carrier substructure comprises an outer region of the support structure on which the anti-capillarity extension rests. In this way, capillary effects between the main body of the first pre-structure and the support structure are avoided along the full perimeter of the main body. Furthermore, the first pre-structure is supported evenly along the perimeter of the first pre-structure by the carrier substructure, whereas the main body is advantageously protected from gravitation-induced deformations through the deformation-control substructure.

According to a preferred embodiment of the present invention, the carrier substructure comprises pillars. The pillars are preferably equidistantly spaced along the perimeter of the first pre-structure. The first pre-structure rests on the carrier substructure only in discrete supporting points. The pillars may be printed, e.g. between the first printing step and the rearrangement step. This allows a simple and efficient adaptation of the pillar arrangement, height and width to the shape of the optical component to be printed. In particular, printing data of the three-dimensional structure can be used to determine pillar arrangement, height and width. Alternatively, the pillars are produced and provided otherwise. It is conceivable that the pillars or at least some of the pillars comprise suspension points for the suspension of the deformation-control substructure from the carrier substructure.

According to a preferred, embodiment of the present invention, the deformation-control substructure comprises a soft-condensed matter sheet. In particular, the sheet is suspended from the carrier substructure. The carrier substructure may comprise pillars or not. The sheet may be preformed, e.g. adapted to the shape of the first pre-structure before the rearrangement step. Thickness, size and material of the sheet are determined by the weight and dimensions of the optical component to be build. The sheet has to comprise a sufficiently smooth surface to ensure sufficient accuracy of the printing process.

According to a preferred embodiment of the present invention, the deformation-protection substructure comprises a soft-condensed matter block. The block may be fixed to the carrier substructure or not. The surface of the block is preferably determined by the shape of the first pre-structure. In particular, the surface of the block is shaped such that the main body of the first pre-structure can be rested at least partially, preferably completely, on the block surface.

According to a preferred embodiment of the present invention, the deformation-protection substructure comprises a balloon. The balloon is used to support the main body of the first pre-structure against gravitational forces. In particular, the air pressure inside the balloon may be adapted such that the gravitationally induced sagging effects are avoided. The balloon preferably adapts to the shape of the first pre-structure in the rearrangement step, but does not alter after its initial adaptation.

According to a preferred embodiment of the present invention, the profile of the upper surface of the deformation-control substructure comprises a negative of the profile of that side of the first pre-structure that is not in contact with the base body. Preferably, the support structure comprises a mold. In this way, it is advantageously ensured that the shape of the first pre-structure remains unaltered after arrangement on the support structure. In particular, the upper surface of the deformation-control substructure prevents deformations of the first pre-structure and thus consequently of the second pre-structure due to gravitation-induced sagging of the structure. Preferably, the printing data, e.g. CAD data, of the intended optical component are used to determine the surface profile of the upper surface of the deformation-control substructure.

In a preferred embodiment, the deformation-control substructure comprises a pressure chamber. The pressure chamber protects the pre-structures from sagging through gravitational forces. Moreover, as no gap between support structure and pre-structure exists, capillary forces are inhibited. In this way, unwanted deformations of the printed pre-structures are advantageously avoided. No mold has to be provided that needs to be individually adapted to the shape of the structure to be printed. Rather, the deformation-control substructure comprising the pressure chamber protects all structures irrespective of their shape from gravitationally-induced deformations, in particular sagging. The method according to the present invention can thus easily and without alteration be applied to the printing of structures of differing shapes and weights. Additional material, as e.g. for a mold, becomes superfluous. In this way, a time- and material-saving and flexible duplex printing method for optical components is advantageously provided. Preferably, the carrier substructure encloses a space such that a pressure jar or pressure chamber is formed. The pressure chamber is preferably enclosed by the carrier substructure on all sides, the support plate or printing plate at the bottom and the first pre-structure during and/or after the rearrangement step at the top. Here and in the following, "bottom" and "top" are determined by the flight direction of droplets of printing ink during the printing process, i.e. droplets move from top to bottom Preferably, the pressure chamber is sealed off at the contact region of first pre-structure, in particular the extension, and carrier substructure. Preferably, the pressure chamber is filled with a control medium, gas or liquid, e.g. air. The pressure of the control medium can be controlled via active flow control. Preferably, the temperature and/or composition of the control medium can be controlled, i.e. adapted and changed, as well. According to a preferred embodiment of the present invention, the pressure in the pressure chamber is dynamically adjusted to cancel the gravitational forces deforming the first pre-structure and/or the second pre-structure. By regulating the pressure of the control medium in the pressure chamber, a dynamically adjustable force can be advantageously exercised on the first pre-structure, such that the first pre-structure does not deform. In particular, sagging of the first pre-structure and consequently of the second pre-structure due to gravitation is in this way advantageously prevented. According to a preferred embodiment of the present invention, the support structure comprises semi-open elements such that a dynamically adjustable pressure gradient is generated in the pressure chamber. These open elements determine the flow of the control medium in the pressure chamber, generating a pressure gradient along the first pre-structure. Herewith, a dynamically adjustable force gradient across the first pre-structure is generated. In an alternative embodiment, the pressure in the pressure chamber is essentially uniform, generating a uniform pressure across the first pre-structure. According to a preferred embodiment of the present invention, the pressure in the pressure chamber is adjusted depending on the printing data during the second printing step. Herewith it is advantageously possible to adjust the pressure and thus the gravitation-canceling force according to the structure to be build. In particular, the pressure is dynamically adjusted to the printing process as provided by the printing data. Printing data are any data used by the print head to determine the location and volume of ejected droplets of printing ink. Printing data comprise CAD data. The printing data encode in particular the shape of the structures to be printed. According to a preferred embodiment of the present invention, properties of the first pre-structure and/or the second pre-structure are measured during intermediate measurement steps and the pressure in the pressure chamber is adjusted depending on the measurement results. Herewith a feedback loop is advantageously provided that ensures that the pre-structures do not deform during the printing process. Preferably, the intermediate measurements determine whether the first pre-structure retains its initial shape or not. Alternatively or additionally, the intermediate measurements determine whether the second pre-structure retains its intended shape. Preferably, printing data are additionally used to establish, whether the first and/or second pre-structure retain their initial or intended shape, respectively. Measurements comprise contact or non-contact measurements. Preferably, the intermediate measurements are dynamic position measurements. Intermediate measurement steps may be carried out after each deposition of droplets or layers of printing ink or at certain intervals. Preferably, the intermediate measurement steps are carried out during the first and/or second printing step. It is also conceivable that intermediate measurement steps are carried out during the rearrangement step after placement of the first pre-strudure on the support structure. According to a preferred embodiment of the present invention, the surface properties of at least one surface of the first pre-structure and/or the second pre-structure are determined during the intermediate measurement steps. In this way it is advantageously possible to determine whether the first and/or second pre-structures retain their initial or intended shape, respectively, from a simple surface measurement. Surface properties to be measured are in particular geometrical properties of the surface, e.g. surface profiles, line profiles, profile scans, height, distance from the print head or any other reference point and surface gradients. The surface properties may be determined by optical measurements, e.g. laser measurements such as laser interferometry and laser triangulation or coherence scanning interferometry. The optical measurements may be carried out on the full surface, only pointwise or in one-dimensional, e.g. line, scans. According to a preferred embodiment of the present invention, the first pre-structure and/or the second pre-structure comprises reference points, the location of which are measured during the intermediate measurement steps in order to determine properties of the first pre-structure and/or the second pre-structure. It is herewith advantageously possible to detect deformations of the pre-structures in simple, non-contact measurements. Preferably, the reference points are located in the base body.

In a preferred embodiment, the second printing step comprises a post-processing step, e.g. a coating step or a final hardening or curing step. After the second printing step, the printed structure is removed from the printer and further post-processing may be carried out, e.g. cutting, edging or framing.

According to a preferred embodiment of the present invention, the base body comprises a flat disk. Herewith, a base body is provided that is easy to produce and allows, easy handling of the printed structures. Moreover, the base body advantageously prevents shrinking effects as it provides a flat substrate for the first and second printing steps. Preferably, the base body is optically transparent. The base body may comprise glass, plastic, e.g. poly(methyl methacrylate), or printing ink similar to or different from the printing ink used in the first and second printing steps. The base body may be printed or cast. It is preferably round with a diameter that extends beyond the diameter of the actual lens to be printed. In particular, an outer rim or seating is provided by the additional diameter of the base body. The base body is preferably thinner than 1000 micrometers and thicker than 100 micrometers, particularly preferably between 200-500 micrometers thick.

According to a preferred embodiment of the present invention, the substrate is a porous substrate and the base body is clamped to the substrate through a vacuum. Herewith, a controllable force can be exerted that fixes and releases the base body from the substrate. Preferably, the base body is clamped to the substrate before andior during the first printing step. A vacuum is generated preferably below the substrate. "Vacuum" in the sense of the present invention refers to any low-pressure environment that is sufficient to exert a fixation or clamping force on the base body, with or without first pre-structure. Low pressure is preferably applied to the side of the substrate that is opposite to the base body. Through the pores of the substrate, the low pressure is applied to the base body. Clamping the base body to the substrate reduces the error rate in the printing process, in particular during the first printing step, through movement of the base body. Herewith, the accuracy of the printing process is advantageously increased.

According to a preferred embodiment of the present invention, the base body is released from the substrate at the end of the first printing step, in this way, the base body is released to allow rotation and arrangement of the first pre-structure during the rearrangement step. The base body is preferably released by turning off the vacuum, i.e. Increasing the pressure applied to the substrate. Releasing and fixing the base body to the substrate may be automated process steps.

According to a preferred embodiment of the present invention, the support structure is printed between the first printing step and the rearrangement step. In this way, a support structure specifically adapted to the optical component to be printed is advantageously provided. Herewith, a method is provided that allows customization of optical components and their production on-demand. In particular, no prefabricated component is needed apart from the base body. As the base body leaves maximal flexibility, this does not limit the shape and optical properties of the optical component to be printed. Preferably, the printing data of the optical component can be used to determine the printing data for the print of the at least part of the support structure. Moreover, the support structure is advantageously provided directly inside the printer at the location where the second printing step is carried out. In a preferred embodiment, at least part of the carrier substructure is printed. Alternatively or additionally, at least part of the deformation-control substructure is printed. In this way, it is possible to choose the material for the two substructures according to their functions. In a preferred embodiment, the entire carrier substructure is printed. In another preferred embodiment, the entire deformation-control substructure is printed. According to a preferred embodiment of the present invention, the carrier substructure and the deformation-control substructure are printed as a single piece. Printing the entire support structure in a single piece, a particularly simple and easy-to-produce support structure is provided. The duplex printing method is simplified and sped up in this way. In particular, the deformation-control substructure comprises a mold of that part of the first pre-structure that is arranged on the deformation-control substructure during the rearrangement step. Printing data of the first and second pre-structures are preferably used to determine the printing data for the support structure. In this way, also complex structures can be efficiently supported and protected from gravitational deformation during the duplex printing process. The carrier substructure is preferably printed as an outer ring extending beyond the mold, providing a seating for the extension. Preferably, the top surface of the carrier substructure is flat. The support structure may comprise a coating, e.g. for easy removal of the finished structure from the support structure.

According to a preferred embodiment of the present invention, the support structure is loaded into the printer between the first printing step and the rearrangement step. Herewith, a scalable and quick assembling method for optical components is provided, in particular, the time spent on printing and providing and individualized support structure for optical components of non-conventional shape is saved through the use of prefabncated support structures. Different types of support structures may be provided, preferably comprising concave, convex or plane upper surfaces of the deformation-control substructure. The types of support structures may differ in the curvature of the upper surface. In an alternative embodiment, the deformation-control substructure is independent of the shape of the first pre-structure. The deformation-control substructure may comprise an adaptable soft-matter sheet or soft-matter block or adjustable balloon. Alternatively, the deformation-control substructure may comprise a pressure chamber.

According to a preferred embodiment of the present invention, the carrier substructure comprises a fixation means which fixes the first pre-structure to the carrier substructure at the beginning of the rearrangement step and the first pre-structure is rotated with the support structure during the rearrangement step. Herewith, a method is provided that allows automated, contact-free flipping of the first pre-structure. In particular, the first pre-structure is protected, preferably enclosed, be the support structure and the base body during the rearrangement step. Preferably, the first pre-structure, in particular the base body, e.g. its extension, is clamped to the carrier substructure. The fixation means is part of the carrier substructure. The first pre-structure, in particular the base body, e.g. its extension, may comprise corresponding means that allow a clamping of the first pre-structure to the carrier substructure. In the sense of the present invention, the fixation is not permanent. Rather, the first pre-structure gets fixed to the carrier substructure during or before the rearrangement step. The fixation is released such that the pre-structures can be removed, preferably at the end of the printing process, i,e. after the second printing step. Alternatively, the fixation is released at the end of the rearrangement step. The first pre-structure is fixed to the carrier substructure e.g. mechanically, electromagnetically and/or through high or low pressure. According to a preferred embodiment of the present invention, the fixation means comprises an electromagnetic element and the first pre-structure is fixed to the carrier substructure through electromagnetic forces. The electromagnetic element advantageously clamps the first pre-structure, in particular the base body, e.g. its extension, to the carrier substructure. Preferably, the electromagnetic element comprises an electromagnet that can be turned on and off to clamp and release the first pre-structure. Correspondingly, the first pre-structure may comprise an electromagnetic element, e.g. an electromagnetic ring or metallic ring, which interacts with the electromagnetic element of the carrier substructure, it is conceivable that carrier substructure and/or first pre-structure comprise one or more electromagnetic elements. E.g. several electromagnetic elements may be arranged equidistantly along the perimeter of the carrier substructure. According to a preferred embodiment of the present invention, the orientation and/or the position of the first pre-structure and/or the second pre-structure are changed through the electromagnetic element of the carrier substructure. The pre-structure can be moved contactlessly through the electromagnetic elements. In particular, in conjunction with a second electromagnetic element inside the first pre-structure, preferably in the base body, e.g. its extension, does it provide an efficient and easy means to control and adjust the position of the pre-structures.

According to a preferred embodiment of the present, invention, the fixation means comprises a vacuum chamber. Herewith, a fixation means is provided whose exercisable force can be adapted to the weight of the first pre-structure. In the sense, of the present invention, "vacuum" comprises a low-pressure environment, wherein the pressure is low enough to clamp the first pre-structure to the carrier substructure. Preferably, the carrier substructure comprises an inner part and an outer part, wherein a vacuum chamber is enclosed by the inner and outer parts. The inner and outer parts may be concentrically arranged rings or walls. The first pre-structure, preferably the base body, e.g. its extension, seals off the vacuum chamber. The carrier substructure may comprise a seal to this end. The pressure in the vacuum chamber is chosen such that the first pre-structure is clamped to the carrier substructure. It may be necessary to change the pressure in the vacuum chamber depending on the pressure in the pressure chamber during the second printing step. E.g. if the pressure in the pressure chamber is increased, the pressure in the vacuum chamber may be reduced in order to keep the pre-structures in place. In particular, the first pre-structure is fixed to the carrier substructure at the beginning of the rearrangement step in order to lift up and rotate the first pre-structure. Preferably, the vacuum is turned on slightly before or at the same time as the vacuum that clamps the base body to the substrate is turned off.

According to a preferred embodiment of the present invention, the base body comprises a functional layer between a first and a second cover layer. In this way, an assembling method is provided that allows the assembly of optical components comprising functional components. Preferably, the base body comprising a functional layer is prefabricated and loaded into the printer. In particular, the functional layer is provided with functional components before the assembly process of the optical component. In this way, the integration of functional components is advantageously separated from the assembly process of the optical component. This significantly simplifies and speeds up the assembly of the optical component. The first and second cover layer preferably constitute flat surfaces to which the printing ink easily bonds. Preferably, the functional layer comprises functions used by the end consumer of the optical component or by the manufacturer at any step of the production process. Functions comprise optical functions, elements suitable for virtual-reality applications or reference systems, identification systems, codes and the likes.

According to a preferred embodiment of the present invention, the functional layer comprises an optical component and/or an electrical component, in this way, the optical functionality of the optical component can be enhanced. In particular, the optical component comprises a gradient index layer and/or a component with a specified refraction index differing. Additionally or alternatively, the optical component may provide a color, tint or eye protection. The electrical component comprises displays, in particular Liquid Crystal Displays, circuitry, chips, sensors and the like.

According to a preferred embodiment of the present invention, the base body comprises a functional element. In this way, the optical component can easily and straightforwardly be provided with additional functionality. The functional element may be an optical or an electrical element. An optical element e.g. comprises a lens or lens element. Electrical elements comprise displays, in particular Liquid Crystal Displays, circuitry, chips, sensors and the like.

According to a preferred embodiment of the present invention, the first surface of the base body is pre-structured in a first surface preparation step between the providing step and the first printing step in order to enhance the adhesion properties of the first surface and/or wherein the second surface of the base body is pre-structured in a second surface preparation step between the rearrangement step and the second printing step in order to enhance the adhesion properties of the second surface. The first and/or second surface preparation step enhance the bonding of the first and/or second pre-structures to the base body. Stability and reliability of the optical component are thus enhanced. Surface preparation preferably comprises a roughening of the surface, e.g. through engraving or chemical treatment. Alternatively and additionally, the surface preparation step may involve application of a chemical, e.g. glue or coating, and/or a thermal treatment of the surfaces, e.g. heating.

According to a preferred embodiment of the present invention, the base body is loaded from a stack of base bodies in the providing step. Herewith, automation and scaling are enabled. Preferably, the stack of base bodies can be directly connected to the printer. The stack may comprise a number of identical base bodies or the stack may comprise different sorts of base bodies. Sorts may differ in Material, diameter, thickness, additional functional components, etc. It is conceivable that the support structures are loaded from a stack as well. The stack may comprise a number of identical support structures or the stack may comprise different sorts of support structures. Sorts may differ in material, size, upper surface profile, etc. The choice of base body and the choice of support structure may be mutually dependent andlor dependent on the printing data of the optical component.

Another object of the present invention is a three-dimensional optical component assembled by a method according to one of the preceding claims, comprising a first pre-structure, a second pre-structure and a base body. In printing an optical component with a duplex printing method, an, optical component with particularly smooth surfaces is provided. As the upper surfaces of the first and second pre-structure are pnnted under the smoothening effect of gravitational forces acting tangent to both surfaces during the printing process, the upper surfaces of the first and second pre-structure are particularly smooth. It is an advantage of the presented duplex printing method, that this gravitational smoothing can be exploited for two surfaces of the final structure, preferably the upper and lower surfaces of the final optical component. According to a preferred embodiment of the present invention, the optical component comprises a lens or lens blank. The optical component is preferably thin in one dimension. The upper surfaces of the first and second pre-structure comprise the first and the second surface of the final optical component, in particular the inner and outer surface of a lens. The surfaces of the first and second pre-structures are preferably convex, concave or plane. The central plane is preferably orthogonal to the thin dimension. Preferably, the optical component is round in the dimensions orthogonal to the thin dimension. Particularly preferably, the optical component forms a duplex printed lens blank. The optical component may comprise an extension, forming a rim or seating around the outer perimeter of the component, in particular a flat ring.

Another object of the present invention is an assembly kit for the assembly of a three-dimensional optical component according to claims 1 to 13, comprising a duplex printer for printing three-dimensional optical components according to claims 1 to 13 and at least one base body. The duplex printer for printing three-dimensional structures with a method according to any of the claims 1 to 13, preferably comprises a printing unit and a fixation control unit. Herewith, a duplex printer for flexible, high-accuracy duplex printing of optical components is advantageously provided. The fixation control unit activates and releases the fixation means. Preferably, the fixation control unit comprises an electromagnetic control unit and/or a pressure control unit. The electromagnetic control unit controls the electromagnetic element of the carrier substructure and preferably the electromagnetic element of the first pre-structure, in particular of the base body. The printer may additionally comprise a measurement unit that, in conjunction with a pressure control unit, ensures that the structure to be printed is not impaired by deformations due to sagging under gravitational forces. In particular, a feedback loop is provided that ensures high accuracy and precision in the printing process. In particular, it ensures that the final shape of the optical component coincides with the intended shape to a high degree of accuracy.

Preferably, the printing unit comprises a print head with ejection nozzles for the deposition of droplets of printing ink. Such print heads and printing units are known. The printing unit may be a printing unit of a 3d- or inkjet printer. The printing unit further comprises a printing plate or support plate towards which the deposited droplets are ejected. The printing plate may comprise openings for the pumping of the vacuum under the porous substrate. The measurement unit, comprises a measurement apparatus for the measurement of properties, in particular surface properties, of the first pre-structure. In particular, the measurement unit may comprise an apparatus for optical measurements, e.g. laser displacement sensors, interferometric sensors, confocal chromatic measurement systems, white light scanners, etc. The pressure control unit monitors and adjusts at least the vacuum in the vacuum chamber. It may additionally release and inject the control medium into the pressure chamber. Additionally, it may monitor and control the vacuum under the porous substrate. Alternatively, the printer may comprise two separate pressure control units for the pressure chamber and the vacuum chamber, respectively. The two pressure control units may be connected through data exchange.

In a preferred embodiment, the assembly kit comprises a stack of base bodies. Alternatively or additionally, the assembly kit comprises a stack of support structures. Base bodies and/or support structures can be automatically loaded into the printer from the respective stack.

BRIEF DESCRIPTION OF THE DRAWINGS

FIG. 1 schematically illustrates a method according to an exemplary embodiment of the present invention.

FIG. 2 schematically illustrates a method according to an alternative exemplary embodiment of the present invention.

FIGS. 3a, 3b, and 3c schematically illustrate a base body according to three alternative exemplary embodiments of the present invention.

DETAILED DESCRIPTION

Figure 4:
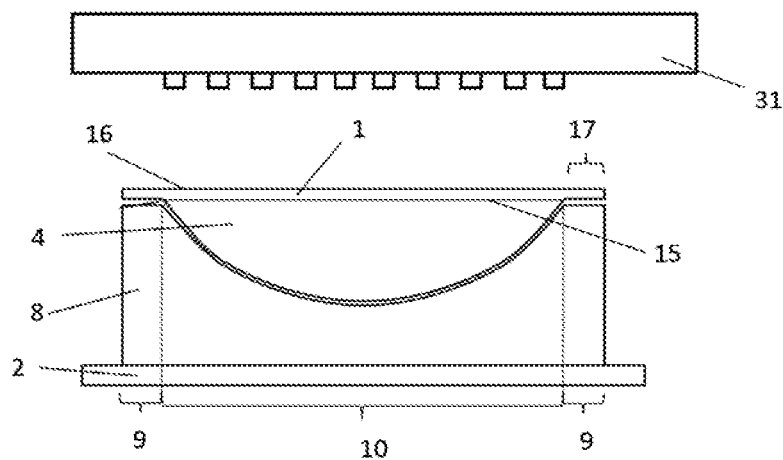
FIG. 4 schematically illustrates a support st ructure according to an exemplary embodiment of the present invention.

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale.

Where an indefinite or definite article is used when referring to a singular noun, e.g. "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 a method according to an exemplary embodiment of the present invention is schematically illustrated. In the providing step, a base body is loaded on a substrate in a printer. The printer is preferably a 3d inkjet printer or droplet-on-demand printer. The printer comprises a print head 31 with ejection nozzles for ejecting droplets of printing ink towards the substrate Preferably, the deposited droplets are cured during intermediate curing steps, e.g. through light irradiation, preferably with UV light. The printing ink preferably comprises a monomer that polymerizes during curing. In particular, the printing ink comprises a transparent or translucent printing ink. During the printing steps, droplets of printing ink are deposited at least partially side by side and one above the other to build up a three-dimensional structure, e.g an optical component, layer by layer. Particularly preferably, a time interval elapses between deposition of the droplets and their curing. This allows the droplets to flow and to merge or coalesce. In this way, particularly smooth surfaces are provided, for the individual layers as well as of the final printed structure. It is a particular advantage of the duplex printing method, that the inner and outer surfaces of the optical component 6 can both be printed under the exploitation of tangential gravitational forces. Under the influence of these forces, the droplets flow and thus smoothen the surface of the printed layer. In this way, an optical component 6 with particularly smooth surfaces is provided. The base body 1 is loaded into the printer e.g. from a stack of base bodies 1. The base body 1 preferably comprises a flat, round disk. The base body 1 may comprise an optically transparent material, e.g glass or a polymer. The base body 1 may have been obtained through printing or may have been produced by conventional manufacturing methods, such as casting etc. The base body according to the present invention comprises an extension 17. This extension 17 prevents capillary forces from dragging printing material deposited during the printing steps into a gap between the support structure and the printed structure or the base body 1, respectively. The extension may comprise a ring or seating, extending beyond the perimeter of a main body of the optical component 6, in particular its first pre-structure 4, to be build, allowing the fixation and handling of the base body 1. Alternatively, the extension 6 may comprise a number of ridges extending radially outward allowing the fixation and handling of the base body 1. The ridges are preferably equidistantly spaced along the perimeter of the base body 1. The base body 1 is arranged preferably on a porous substrate 3. Under the substrate 3, a vacuum 7 is applied. Through the pores of the porous substrate 3, the base body 1 is efficiently clamped to the substrate 3 by the vacuum 7. An efficient and easily controllable fixation means is in this way provided. The upper surface, i.e. the surface facing the print head 31 after arrangement on the substrate 3, of the base body 1 is preferably treated in a surface preparation step. This upper surface is henceforward referred to as first surface 15 of the base body 1. In particular, adhesion properties of the first surface 15 are enhanced during a first surface preparation step through pre-structuring of the first surface 15, e.g. through roughening or engraving. During the first printing step, the first pre-structure 4 is build up through a deposition of droplets of printing ink layer by layer. The droplets are deposited on the first surface 15 of the base body 1, except for the extension 17. The first pre-structure 4 is not printed on the extension 17 of the base body 1. After the first printing step, the base body 1 is released from the substrate 3. In particular, the vacuum 7 is turned off. The first printing step is followed by a rearrangement step. During the rearrangement step, the first pre-structure 4 with the base body 1 is rotated and arranged on a support structure 8. The support structure 8 is preferably arranged on a printing plate 2. The support structure 8 comprises a carrier substructure 9 on which the extension 17 of the base body 1 rests. The carrier substructure 9 may comprise a ring-like structure along the perimeter of the support structure 8. Alternatively, the carrier substructure 9 comprises pillars spaced equidistantly along, the perimeter of the support structure 8. Preferably, the first pre-structure 4 with the base body 1 is flipped, i.e. rotated, by 180° about an axis, along one of its non-thin dimensions. The first pre-structure 4 thus hangs thus upside down from the base body 1. Under the influence of gravitational forces, the first pre-structure 4 may sag. To prevent such an unwanted deformation of the first pre-structure 4, the support structure may comprise an deformation-control substructure 10. The deformation-control substructure 5 supports in particular the first pre-structure 4 against gravitational forces, hence advantageously preventing deformations due to sagging. The upper surface of the deformation-control substructure 10 is therefore preferably shaped such that it perfectly fits the shape of the rotated first pre-structure 4 when arranged on the support structure 8. In particular, the profile of the upper surface of the deformation-control substructure 10 is negative of the profile of the first pre-structure 4, in particular of the profile of the upper side, i.e. the last layers printed during the first printing step, of the first pre-structure 4. In a preferred embodiment, the support structure 8 is printed as a single-piece mold with carrier substructure 9 and deformation-control substructure 10. Preferably, the support structure 8 is printed after the first printing step. Alternatively, the support structure 8 may be provided after the first printing step. Alternative embodiments of the support structure 8 are conceivable, see FIG. 4 to FIG. 8. The support structure 8 may be at least partially printed after the first printing step. Alternatively, the support structure 8 may be loaded into the printer, e.g. from a stack of support structures 8. At the end of the rearrangement step, preferably the surface opposite to the first surface 15 of the base body 1 faces the print head 31. The surface of the base body 1 which is opposite to the first surface 15 will henceforward be referred to as second surface 16 of the base body 1. The second surface 16 may be treated in a second surface preparation step. During the second surface preparation step, the second surface 16 is preferably pre-structured in order to enhance adhesion properties of the second surface 16. The second surface 16 may be structured through engraving or roughening. The first and second surface preparation steps ensure a stable and efficient binding of the first layers of the first and second pre-structures 4, 5 to the respective first and second surfaces 15, 16 of the base body 1. After the rearrangement step, the second pre-structure 5 is printed on the second surface 16 during the second printing step, except for the extension 17. The second pre-structure 5 is not printed on the extension 17 of the base body 1. The extension 17 thus remains free from printing ink. It is therefore particularly apt for handling of the printed structures. The second printing step may involve post-processing steps such as final curing or hardening or coating. At the end of the second printing step, the final optical component is removed from the printer. Further post-processing steps, such as edging, framing and cutting, may follow.

In FIG. 2 a method according to an alternative exemplary, embodiment of the present invention is schematically illustrated. The present embodiment differs from the embodiment depicted and described in FIG. 1 in the rearrangement step. Whereas in the embodiment according to FIG. 1, the first pre-structure 4 together with the base body 1 is first rotated and then arranged on the support structure 8, this order is reversed in the present embodiment Namely, the support structure 8 is not arranged on a printing plate 2 before the rearrangement step. Rather, the support structure 8 approximates the first pre-structure 4 from above. Here and in the following, "above" and "below" are defined by the direction of flight of the droplets of printing ink, i.e. droplets of printing ink move from "above" to "below". The support structure 8 is preferably first aligned with the first pre-structure 4. Preferably, the carrier substructure 9 is aligned above the extension 17 and the deformation-control substructure 10 is aligned above the first pre-structure 4, i.e. its main body. Then the support structure 2 is lowered until the carrier substructure 9 contacts the extension 17. Preferably, the carrier substructure 9 comprises a fixation means by which the extension 17 is fixed or clamped to the carrier substructure 9. The fixation means may comprise an electromagnetic element, a mechanical element or a pressure-regulated element, see also FIG. 4 to FIG. 8. Preferably, the fixation means comprises a vacuum chamber 18. The carrier substructure 9 preferably comprises an inner ring, an outer ring and a space enclosed by the inner ring, the outer ring and the extension 17 which provides a vacuum chamber 18. "Vacuum" in the sense of the present invention refers to any low-pressure environment. The pressure has to be sufficiently low to fix the first pre-structure 4 with the base body 1 to the carrier substructure 9. The carrier substructure 9 may be connected to a support plate 19 with openings 20 through which the vacuum can be applied to the vacuum chamber 18. The support plate 19 may comprise a printing plate 2. While the support structure 8 is being aligned with the first pre-structure 4, the vacuum under the porous substrate 3 is de-pressurized such that the vacuum is turned off after the vacuum in the vacuum chamber 18 is turned on. Thus, the base body 1 is released from the substrate 3. Base body 1, first pre-structure 4 and support structure 8 are rotated. The first pre-structure 4 is advantageously protected between the support structure 8 and the base body 1 during rotation. Preferably, base body 1, first pre-structure 4 and support structure 8 are flipped, i.e, rotated about a horizontal axis, by 180° such that at the end of the rearrangement step, the first pre-structure 4 is turned upside down, i.e. with the second surface 16 facing the print head 31. In this way, a method is provided for automatically flipping the first pre-structure 4 during the rearrangement step during which the first pre-structure 4 is particularly well protected from damage. All other steps follow as described above.

In FIGS. 3a to 3c a base body 1 according to three exemplary embodiments of the present invention are schematically illustrated, According to the first embodiment, the base body 1 comprises a blank disk, see FIG. 3a. The base body 1 comprises a flat disk. In the sense of the present invention, a flat disk comprises a flat cylinder, i.e. a cylinder with a height h significantly smaller than its diameter d. Preferably, the diameter d is less than 100 mm, particularly preferable about 60 mm. The height h of the base body 1 is preferably less than 1000 micrometers, particularly preferably between 100 and 1000 micrometers. The height h of the base body 1 may be 250 micrometers or 500 micrometers. The base body 1 comprises an optically transparent material, preferably glass or a polymer. The base body 1 may be printed with printing ink or the base body 1 may be produced by conventional manufacturing means, e.g. cast. The base body 1 comprises an extension 17. Preferably, the extension 17 comprises the outer ring of the base body 1. In an alternative embodiment, the extension 17 comprises several ridges that radiate outward from the centre of the disk and are preferably equidistantly spaced along the perimeter of the disk. The base body 1 may comprise a functional element 11, see FIG. 3b. The functional element 11 is preferably embedded into the base body 1. The functional element 11 may be embedded into the base body 1 during a printing process. The functional element 11 may be embedded into the base body 1 by any other known manufacturing means. The functional element 11 is preferably thinner than the height h of the base body 1. The functional element 11 is preferably smaller than the diameter d of the base body 1. It is herewith advantageously ensured that printing during the first and second printing steps is carried out on the first and second surfaces 15, 16 of the base body 1 and not on a surface of the functional element 11 itself. In this way, a stable optical component 6 is being provided. Preferably, the functional element 11 comprises an optical and/or electrical element. E.g. the functional element 11 may comprise a lens. Alternatively, the functional element 11 may comprise a display, in particular a Liquid Crystal Display. The functional element 11 may comprise circuitry, chips and/or sensors. In this way, the optical component 6 to be assembled can be easily and straightforwardly provided with additional functionality, e.g. for virtual reality or individualisation purposes. In particular, the assembly process does not necessitate an integration of functional elements 11. The functional elements 11 are straightforwardly provided together with the base body 1. It is conceivable that the base body 1 comprises more than one function element 11. In an alternative embodiment, the base body 1 comprises a functional layer 12, see FIG. 3c. The functional layer 12 is preferably arranged between a first and a second cover layer 13, 14. The first and the second cover layer 13, 14 act as compatibility layers to ensure an effective and efficient bonding of the printing ink deposited during the first and second printing steps on the first and second surfaces 15, 16 of the base body 1. Preferably, the functional layer 12, as well as the first and second cover layer 13, 14 have the same diameter as the base body 1, namely the diameter d. The height h of a base body 1 with functional layer 12 is preferably larger than the height h of a base body 1 without functional layer 12. Preferably, the height h of the base body 1 with functional layer 12 is larger than 500 micrometres. The functional layer 12 itself preferably has a height h' of preferably 250 micrometres or 500 micrometres. The functional layer 12 preferably comprises an optical component and/or an electrical component. The optical component may comprise a gradient index layer, a coloured and/or tinted layer and/or any other layer with an optical function. The electrical component may comprise a display, e.g. a Liquid Crystal Display, circuitry, sensors and/or chips. The functional layer 12 may provide the optical component 6 with additional optical functionality and/or additional, e.g. virtual reality, functionality. It is conceivable that the base body 1 comprises more than one functional layer 12. These may be stacked one above the other or they may be separated by additional cover layers. The height h of the base body 1 has to be adjusted accordingly.

In FIG. 4, a support structure 8 according to an exemplary embodiment of the present invention is schematically illustrated. The support structure 8 comprises a carrier substructure 9 and an deformation-control substructure 10. The carrier substructure 9 is executed as one piece with the deformation-control substructure 10. The deformation-control substructure 10 comprises preferably a mold on which the main body of the first pre-structure 4 rests. The carrier substructure 9 comprises an outer part of the support structure 8 which encloses the deformation-control substructure 10. In particular, the extension 17 of the first pre-structure 4 rests on the carrier substructure 8. The carrier substructure 8 is preferably arranged along the perimeter of the first pre-structure 4, in particular the extension 17. The support structure 8 may be printed between the first printing step and the rearrangement step or the support structure 8 may be otherwise provided, e.g. loaded from a stack.

Figure 5:
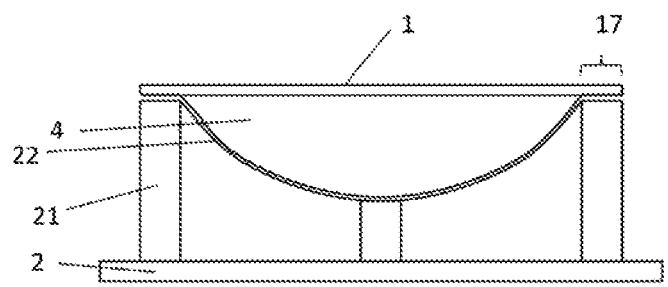
FIG. 5 schematically illustrates a support structure according to an alternative exemplary embodiment of the present invention.

In FIG. 5, a support structure 8 according to an exemplary embodiment of the present invention is schematically illustrated. The present embodiment differs from the embodiment depicted and described in FIG. 4 in the support structure 8. The support structure 8 comprises a carrier substructure 9 and a deformation-control substructure 10. The carrier substructure 9 comprises pillars 21 on which the pre-structures 4, 5, in particular the extension 17 of the first pre-structure 4 are pointwise supported. The pillars 21 are preferably arranged along the perimeter of the first pre-structure 4, in particular the extension 17 in particular, the pillars 21 are equidistantly spaced. From the pillars 21, the deformation-control substructure 10 is suspended. The deformation-control substructure 10 comprises a sheet 22, in particular a soft-matter sheet 22. The sheet 22 may comprise any flexible and sufficiently smooth material. Preferably, the sheet 22 adapts to the form of the first pre-structure 4. The pillars 21 may be solid or hollow. The pillars 21 may be printed between the first printing step and the rearrangement step or the pillars 21 may be otherwise provided, e.g. loaded from a stack. The pillars 21 may be connected to fix their arrangement, e.g. through a ring-like structure that connects the bottom of the pillars 21. In this way, the pillar arrangement is stabilized and kept fixed.

Figure 6:
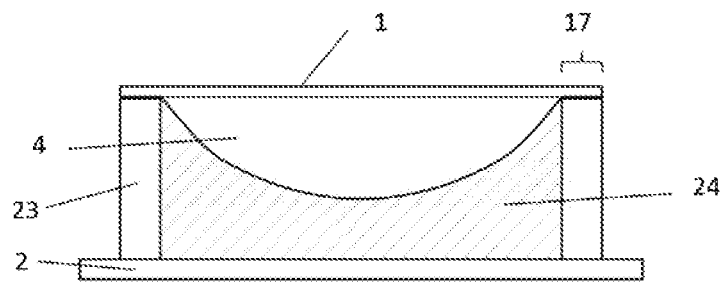
FIG. 6 schematically illustrates a support structure according to an alternative exemplary embodiment of the present invention.

In FIG. 6, a support structure 8 according to an, exemplary embodiment of the present invention is schematically illustrated. The present embodiment differs from the embodiment depicted and described in FIG. 4 in the support structure 8. The support structure 8 comprises a carrier substructure 9 and an deformation-control substructure 10. The carrier substructure 9 comprises a ring 23 on which the pre-structures 4, 5, in particular the extension 17 of the first pre-structure 4 rest. The ring 23 may be solid or hollow. The deformation-control substructure 10 comprises a soft-matter block 24. The main body of the first pre-structure 4 rests on the soft-matter block 24, in particular on the upper surface of the soft-matter block 24. The soft-matter block 24 is comprised of soft matter, e.g. rubber. The upper surface of the soft-matter block 24 comprises a profile that is the negative of the profile of the side of the first pre-structure 4 opposite to the base body 1. The soft-matter block 24 may be fixed to the carrier substructure 9 or not. Instead of, a soft-matter block 24, the deformation-control substructure 10 may comprise a balloon, whose size can be easily adapted to, the shape and size of the first pre-structure 4.

Figure 7:
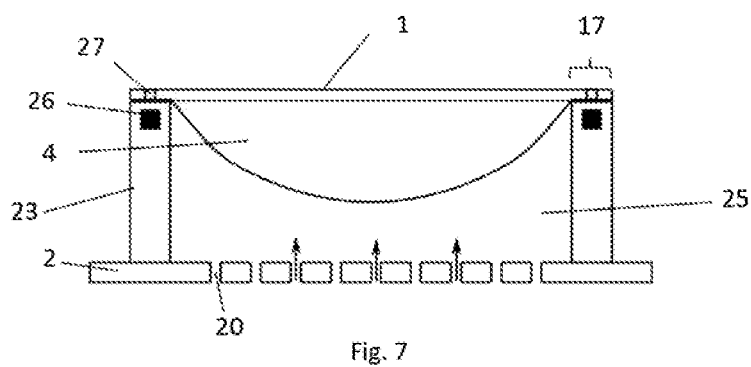
FIG. 7 schematically illustrates a support structure according to an alternative exemplary embodiment of the present invention.

In FIG. 7, a support structure 8 according to an exemplary embodiment of the present invention is schematically illustrated. The present embodiment differs from the embodiment depicted and described in FIG. 4 in the support structure 8. After the first printing step, the first pre-structure 4 is lifted from the substrate 3, rotated and arranged on a support structure 8 in a rearrangement step. Preferably, the first pre-structure 4 is rotated about a horizontal axis by 180° so that the base body 1 faces the ejection nozzles of the print head 31. In particular, the first pre-structure 4 is arranged on the support structure 8 such that the extension 17 rests on a carrier substructure 9 of the support structure 8 and the main body of the first pre-structure 4 is supported by an deformation-control substructure 10. The deformation-control substructure 10 comprises a pressure chamber 25. The extension 17 seals off the pressure chamber 25 against the carrier substructure 9, Between the extension 17 and the carrier substructure 9 a seal may be provided. Whereas the extension 17 in conjunction with the carrier substructure 9 prevents the occurrence of capillary effects and corresponding capillary-induced deformations, the deformation-control substructure 10 prevents gravitationally-induced deformations, in particular sagging of the pre-structures 4, 5, In particular, the pressure in the pressure chamber 25 is adjusted in order to cancel the gravitational forces causing a sagging of the pre-structures 4, 5. To this end, a control medium is injected into the pressure chamber 25. The control medium comprises a liquid or gas, preferably air. The control medium may be injected through openings 20 in the printing plate 2. Preferably, the pressure in the pressure chamber 25 can be monitored and controlled, i.e. adapted and changed. The pressure inside the pressure chamber 25 may be uniform across the first pre-structure 4. Alternatively, the carrier substructure 9 comprises at least semi-open elements which generate a pressure gradient across the first pre-structure 4. The rearrangement step may comprise a surface preparation step in which the surface of the side of the first pre-structure facing the ejection nozzles at the end of the rearrangement step is treated in order to improve its adhesion properties. If the first layers of the first pre-structure 4 are only partly cured, such a surface preparation step may not be necessary and the only partly cured droplets of printing ink merge and bond efficiently with the droplets deposited during the second printing step. Alternatively and additionally, the surface may be heated or roughened, e.g. through engraving, in order to enhance its adhesion properties. Printing of the second pre-structure 5 is carried out in the second printing step. In a preferred embodiment, measurements are carried out on the first and/or second pre-structures 4, 5 in order to determine deformations of the pre-structures 4, 5. Preferably, the surface properties of the first and/or second pre-structures 4, 5 are determined. Surface properties include profiles, height, distance to the measurement unit or any other reference point, deformations of the surface, height variations, gradients etc. Preferably, the pressure in the pressure chamber 25 is adjusted depending on the detected deformations of the pre-structures 4, 5. In this way, a feedback loop is advantageously provided which allows a continuous adaptation of the deformation-control substructure 10, in particular the pressure in the pressure chamber 16, on the actual acting forces and deformations. In a preferred embodiment, surface measurements are carried out on the upper surface, i.e. the last printed layers, of the first pre-structure 4. These measurements may be carried out from below or above the first pre-structure 4, preferably from below. E.g. surface properties may be determined through laser measurements such as laser triangulation and/or white light scanning (coherence scanning interferometry) and/or confocal chromatic measurement. Measurements may be carried out in full surface scans or fast line scans or area- or pointwise. Additionally, printing data may be used to adjust the pressure in the pressure chamber 25, preferably in conjunction with the measurement results. This is particularly beneficial if surface properties of the second pre-structure 15 are determined during the measurement steps. Whereas for the first pre-structure 4, the measurement establishes whether or not the first pre-structure 4 retains its initial shape, in case of the second pre-structure 5, the measurement has to establish whether or not the second pre-structure 5 retains or obtains its desired shape. The printing data, in particular of the second pre-structure 5, are thus useful in comparing the measured with the intended shape. The pressure in the pressure chamber 16 exerts an upwards directed force on the pre-structures 4, 5 that may lift up or otherwise delocate the pre-structures 4, 5. To prevent such an unwanted movement of the pre-structures 4, 5, the support structure 8, in particular the carrier substructure 9, comprises a fixation means. The fixation means fixes or clamps the first pre-structure 4, preferably the extension 17, to the carrier substructure 9. The first pre-structure 4 is preferably fixed to the carrier substructure from the moment in which the pressure is injected into the pressure chamber 25 until the pressure is released and the final optical component 6 removed from the printer at the end of the second printing step. Preferably, the fixation means exerts a controllable force on the first pre-structure 4, preferably in conjunction with a second fixation means provided in the first pre-structure 4. In a preferred embodiment, the fixation means comprises an electromagnetic element 26 of the carried substructure and an electromagnetic element 27 located in the extension 17. In the present embodiment, where the carrier substructure 9 forms a ring, the electromagnetic element 26 may comprise a ring-shaped electromagnet along the perimeter of the carrier substructure 9. Alternatively, the electromagnetic element 26 comprises several electromagnets that are spaced equidistantly along the perimeter of the carrier substructure 9. The electromagnetic element 27 may comprise a metallic ring or a ring-shaped electromagnet. The reverse arrangement is also conceivable: the carrier substructure 9 may comprise a metallic ring, whereas the extension 17 provides the ring-shaped electromagnet. When e.g. the electromagnet 26 is turned on, the first pre-structure 4 is clamped to the carrier substructure 3. The clamping or fixation force can be controlled through the strength of the electromagnetic force exerted by the electromagnet. This force may be adapted depending on the exerted pressure in the pressure chamber 25 and thus change during the printing process. At the end of the second printing step, the electromagnet may be turned off or its polarity reversed in order to lift off the final optical component from the support structure 8. The second printing step may involve post-processing steps such as final curing or hardening or coating.

Figure 8:
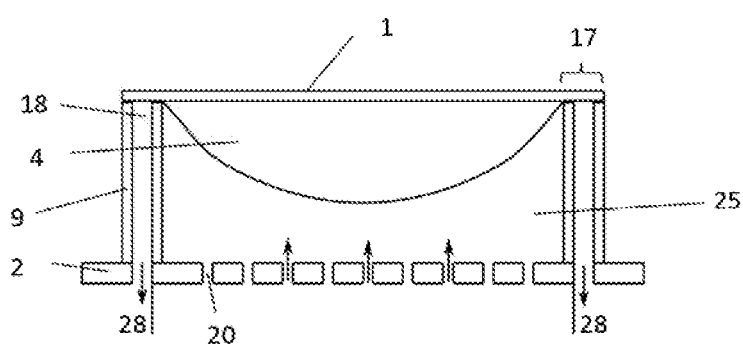
FIG. 8 schematically illustrates a support structure according to an alternative exemplary embodiment of the present invention.

In FIG. 8, a support structure 8 according to an exemplary embodiment of the present invention is schematically illustrated. The present embodiment differs from the embodiment depicted and described in FIG. 7 in the fixation means. The fixation means in the present embodiment comprises a vacuum chamber 18. The vacuum chamber 18 is provided as part of the carrier substructure 9. Preferably, the carrier substructure 9 comprises a hollow ring, inside of which a vacuum chamber 18 is provided. In particular, the carrier substructure 9 comprises an inner part, an outer part and a space enclosed by the inner and outer parts and sealed at the top through the extension 17. This space comprises a vacuum chamber 18. Preferably, the inner and outer parts constitute inner and outer walls of the carrier substructure 9. Alternatively, the carrier substructure 9 comprises hollow pillars inside of which vacuum chambers 19 are located, respectively. The first pre-structure 4 is clamped or fixed to the carrier substructure 9 through the application of a vacuum 28 in the vacuum chamber 18. Preferably, the strength of the applied vacuum 28 is adjusted depending on the pressure exerted in the pressure chamber 25. Additionally, printing data may be used to determine the strength of the applied vacuum 28. Preferably, the vacuum 28 is applied before or at the instant in which the control medium is injected into the pressure chamber 25. The vacuum 28 is preferably turned off at the end of the second printing step in order to release the final optical component 6.

Figure 9:
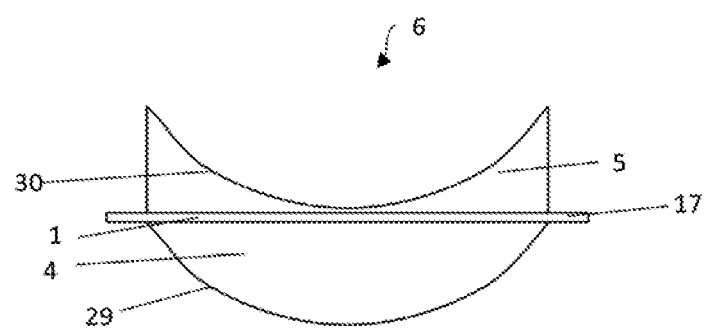
FIG. 9 schematically illustrates an optical component according to an exemplary embodiment of the present invention.

In FIG. 9, a printed optical component 6 according to an exemplary embodiment of the present invention is schematically illustrated. The optical component 6 comprises a first pre-structure 4 and a second pre-structure 5 as well as a base body 1. The extension 17 forms part of the base body 1. In particular, the extension 17 comprises a seating or rim along the perimeter of the base body 1. The first pre-structure 4 is printed on the base body 1 during the first printing step. The base body 1 provides a flat surface on which the first layers of the first pre-structure 4 are printed. In particular, the base body 1 inhibits shrinking effects that otherwise occur during the printing process, especially during curing, due to acting residual stresses. Thus, due to the base body 1, the first pre-structure 4 retains its layered structure as well as its intended final shape. This is particularly important for optically transparent structures as well as structures into which functional components are integrated. In both cases, the layered structure needs to be controlled and retained. The first pre-structure 4 is printed on a first side of the base body 1. In particular, shrinking effects are suppressed. The first and second pre-structures 4, 5 may comprise optical components. In particular, the first and second pre-structures 4, 5 comprise plan-convex and/or plan-concave lens structures. The first and second pre-structures 4, 5 are printed in a duplex printing process by depositing droplets of printing ink at least partially side by side and one above the other. The first and second pre-structures 4, 5 are therefore build up from layers of printing ink. The first and second pre-structures 4, 5 both comprise a layered structure. The duplex printing process provides a final optical component 6 with particularly smooth first and second surfaces 29, 30. These first and second surfaces 29, 30 are the upper surfaces of the first and second pre-structure 4, 5, respectively. The upper surface 30 of the first pre-structure 4 comprises the last layers printed during the first printing step. The upper surface 30 of the second pre-structure 5 comprises the last layers printed during the second printing step. During the first and second printing step, droplets of printing ink are smeared under the influence of a gravitational force that advantageously acts tangential to the surface of the just printed layer. In this way, gravitation can be exploited to obtain a particularly smooth surface, both of the printed layer at hand as well as of the final optical component. This is particularly beneficial for optically transparent structures, i.e. for optical components, in particular lenses. The second pre-structure 5 is printed on the second surface 16 of the base body 1 during the second printing step. In this way, also the second pre-structure 15 retains its layered structure and intended final shape. The second surface 16 is preferably treated in a surface preparation step. In particular, the adhesion properties of the second surface 16 are enhanced during the surface preparation step. Preferably, the second surface 16 is pre-structured, e.g. roughened or engraved, before the second printing step. The extension 17 may be removed after removal of the optical component 6 from the printer in a post-processing step. If the optical component 6 comprises a lens or lens blank, the extension 17 does not need to be removed if the lens is framed, edged or cut in post-processing step, e.g. during fitting the lens to a pair of glasses. If the lens is directly printed in its final shape, a removal of the extension 17 in the post-processing step is necessary.

KEY TO FIGURES

1 Base body
2 Printing plate
3 Substrate
4 First pre-structure
5 Second pre-structure
6 Optical component
7 Vacuum
8 Support structure
9 Carrier substructure
10 Deformation-control substructure
11 Functional element
12 Functional layer
13 First cover layer
14 Second cover layer
15 First surface base body 16 Second surface base body
17 Extension
18 Vacuum chamber
19 Support plate
20 Openings support plate
21 Pillar
22 Sheet
23 Ring
24 Block
25 Pressure chamber
26 Electromagnetic element of carrier substructure
27 Electromagnetic element of first pre-structure
28 Vacuum applied to vacuum chamber
29 First surface of the optical component
30 Second surface of the optical component
31 Print head

What is claimed is:

1. A method for assembling, a three-dimensional optical component from a base body, comprising:
providing the base body and loading the base body on a substrate into a printer in a providing step,
depositing droplets of printing ink on a first surface of the base body in a first printing step in order to build up an intermediate first pre-structure,
depositing droplets of printing ink on a second surface of the base body in a second printing step in order to build up an intermediate second pre-structure,
rotating the first pre-structure and arranging the first pre-structure on a support structure in a rearrangement step between the first printing step and the second printing step,
wherein the support structure comprises a carrier substructure and an extension of the base body rests at least partially on the carrier structure, and
wherein the support structure comprises a carrier substructure and an extension of the base body rests at least partially on the carrier substructure, and
wherein the carrier substructure comprises a fixation means which fixes the first pre-structure to the carrier substructure at the beginning of the rearrangement step and wherein the first pre-structure is rotated with the support structure during the rearrangement step.

2. The method according to claim 1, wherein the support structure comprises a deformation-control substructure.

3. The method according to claim 1, wherein the base body comprises a flat disk.

4. The method according to claim 1, wherein the substrate is a porous substrate and the base body is clamped to the substrate through a vacuum.

5. The method according to claim 1, wherein the base body is released from the substrate at the end of the first printing step.

6. The method according to claim 1, wherein the support structure is printed between the first printing step and the rearrangement step.

7. The method according to claim 1, wherein the support structure is loaded into the printer between the first printing step and the rearrangement step.

8. The method according to claim 1, wherein the fixation means comprises a vacuum chamber.

9. The method according to claim 1, wherein the base body comprises a functional layer between a first and a second cover layer.

10. The method according to claim 9, wherein the functional layer comprises an optical component and/or an electrical component.

11. The method according to claim 1, wherein the base body comprises a functional element.

12. The method according to claim 1, wherein the first surface of the base body is pre-structured in a first surface preparation step between the providing step and the first printing step in order to enhance adhesion properties of the first surface.

13. The method according to claim 12, wherein the second surface of the base body is pre-structured in a second surface preparation step between the rearrangement step and the second printing step in order to enhance adhesion properties of the second surface.

14. The method according to claim 1, wherein the second surface of the base body is pre-structured in a second surface preparation step between the rearrangement step and the second printing step in order to enhance adhesion properties of the second surface.

15. The method according to claim 1, herein the base body is loaded from a stack of base bodies in the providing step.

* * * * *